3,261,881
COATING COMPOSITION OF A CARBOXYLIC ACID AMIDE POLYMER AND AN ORGANOPOLYSILOXANE RESIN
Roger M. Christenson and Henry A. Vogel, Gibsonia, Pa., and Harold G. Bittle, Waukesha, Wis., assignors to Pittsburgh Plate Glass Company, Pittsburgh, Pa., a corporation of Pennsylvania
No Drawing. Continuation of application Ser. No. 270,203, Apr. 3, 1963. This application Aug. 12, 1965, Ser. No. 479,329
16 Claims. (Cl. 260—826)

This application is a continuation of copending application Serial No. 270,203, filed April 3, 1963, now abandoned.

This invention relates to new and improved coating compositions, and more particularly to coating compositions in which the vehicle comprises an unsaturated carboxylic acid amide interpolymer and an organopolysiloxane resin.

Interpolymers of unsaturated carboxylic acid amides, and especially aldehyde-modified, etherified interpolymers of amides and other ethylenically unsaturated monomers, such as those disclosed in U.S. Patent 3,037,963, have been utilized extensively in coating compositions. For example, they are employed as resinous vehicles for enamels and other thermosetting compositions. When so used, such interpolymers give very tough and mar-resistant films having excellent chemical resistance.

Similarly, organosiloxane polymers have been employed in coating compositions and provide specific properties when used therein. However, because of the difficulty encountered in making organosiloxane-containing coatings, their relatively high cost, and because organopolysiloxanes exhibit certain undesirable characteristics, it is necessary to obtain advantages beyond those obtained heretofore in order to make their use in coatings economically feasible.

It has now been found that coating compositions in which the vehicle comprises an interpolymer of an unsaturated carboxylic acid amide along with an organosiloxane resin have superior properties which make them useful in a number of valuable applications. For example these coating compositions are easily baked into excellent films with good chemical and solvent resistance and a high degree of flexibility, toughness, and adhesion.

In addition, it has been discovered that these vehicles, when utilized in pigmented thermosetting enamels, tend to chalk in the same color as the original pigmented film. This surprising and unexpected property makes these compositions especially useful as finishes for exterior structures and as coatings to be applied on, for example, aluminum siding. When used in this manner, they retain the advantages inherent in chalking finishes, e.g., a minimal adherence of dirt and other foreign materials, while overcoming the deterioration in appearance which chalking tends to produce.

Still another advantage of the coating compositions of this invention is their improved resistance to heat over the coating compositions comprising unsaturated carboxylic acid amide interpolymers alone.

The amide polymer component of the compositions of this invention can be any aldehyde-modified polymer of an unsaturated carboxylic acid amide; the aldehyde-modified interpolymer is preferably at least partially etherified. Aldehyde-modified amide polymers are obtained by polymerizing an unsaturated amide and at least one ethylenically unsaturated monomer and reacting the initial product of the polymerization with an aldehyde. Etherification is carried out by further reaction of the aldehyde-modified interpolymer with an alcohol. Alternatively, aldehyde-modified interpolymers are produced by interpolymerizing an aldehyde-modified amide, such as an alkylol amide, which may be then etherified, or by employing an N-alkoxyalkyl amide.

In either case, the aldehyde-modified etherified amide polymer contains amide groups having a hydrogen atom replaced by the structure

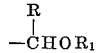

where R is hydrogen or an alkyl radical and $R_1$ is hydrogen or an organic radical.

Methods for producing N-alkoxyalkyl substituted unsaturated carboxylic acid amides such as N-butoxymethyl-acrylamide, which amides are quite useful to produce the amide polymers employed herein, are disclosed in copending applications Serial No. 775,380 (now U.S. Patent No. 3,079,434) and Serial No. 73,177, filed December 2, 1960, now U.S. Patent No. 3,087,965. When these and similarly substituted unsaturated carboxylic acid amides are polymerized, the resulting reaction product contains the aforesaid structure without any further treatment. If, however, the unsaturated carboxylic acid amide does not contain such a structure, i.e., an unsubstituted amide is employed, the resulting amide polymer should be reacted with an aldehyde whereby such structures in which $R_1$ is hydrogen are produced by reaction of the aldehyde with an amido hydrogen atom to produce a hydroxyorgano group. If, as it preferred, the aldehyde-modified product is further reacted with an alcohol, etherification of the hydroxyorgano groups by the alcohol takes place.

Although not essential to the utility of the compositions, it is desirable to etherify at least part of the hydroxyorgano groups of these amide interpolymers produced from unsubstituted or alkylol amides.

After etherification, the amide polymer contains amido groups having a hydrogen atom replaced by the structure

where R is hydrogen when the aldehyde employed is formaldehyde and an alkyl radical when other aliphatic aldehydes are used. $R_1$ is the radical derived by removing a hydroxyl group from the etherifying alcohol, i.e., an organic radical. The radical $R_1$ in those groups not etherified represents hydrogen. $R_1$ in the etherified groups can be, for example, alkyl or aryl. The terms alkyl and aryl, as employed herein, are to be construed broadly; the groups represented by $R_1$ may include other substituents and functional groups which do not affect the properties of the product. Thus, $R_1$ may include unsaturated linkages, ether linkages, halogens, and other substituents, or it may be cyclic.

Satisfactory products may in some instances be obtained with none or only a very small part of the hydroxyorgano groups having been etherified, in some instances 5 percent or less. However, it is usually desirable that at least about 50 percent of the hydroxyorgano groups be etherified, since many compositions having less than about 50 percent of the groups etherified have a tendency to be somewhat less stable and subject to gelation. Butanol is a preferred alcohol for use in the etherification, although any monohydric alcohol such as methanol, ethanol, propanol, pentanol, octanol, decanol and other alkanols containing up to about 20 or more carbon atoms may also be employed, as may aromatic alcohols, such as benzyl alcohol; or cyclic alcohols, such as cyclohexanol; or the monoethers of glycols, such as the Cellosolves and Carbitols; or substituted alcohols, such as 3-chloropropanol.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha,beta-ethylenically unsaturated carboxylic acids containing up to about 10 carbon atoms. Maleuric acid, and esters thereof, and imide derivatives, such as N-carbamyl maleimide, may also be utilized.

In the preferred embodiments of the invention, at least one other unsaturated monomer is interpolymerized with the unsaturated carboxylic acid amide; any polymerizable ethylenically unsaturated monomer can be so utilized. Such monomers include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. The interpolymer compositions described in U.S. Patent 3,037,963 are excellent examples of the preferred type of amide polymers utilized in the instant invention, and the compounds disclosed therein illustrate the numerous monomers which can be interpolymerized along with the amide.

Preferably, the amide polymer should contain from about 2 percent to about 50 percent by weight of the unsaturated carboxylic acid amide component, the balance being the other ethylenically unsaturated monomer(s).

In carrying out the polymerization reaction a peroxygen type catalyst is ordinarily utilized. Useful catalysts for this purpose include acetal benzoyl peroxide, cyclohexanone peroxide, cyclohexyl hydroperoxide, cumene hydroperoxide, acetyl peroxide, lauroyl peroxide, benzoyl peroxide, methyl cyclohexyl hydroperoxide, di-t-butyl peroxide, peracetic acid, t-butyl permaleic acid, di-t-butyl diperphthalate, and the like. Azo compounds, such as p-methoxyphenyl diazothio-(2-naphthyl) ether and alpha, alpha'-azobisisobutyronitrile, may also be used, as may redox catalyst systems. The quantity of catalyst employed can be varied considerably; however, in most instances it is desirable to utilize from about 0.1 to 2.0 percent.

In many instances, it is also desirable to add a chain modifying or "short-stopping" agent to the polymerization mixture. Mercaptans are conventionally used for this purpose, but other chain modifying agents such as cyclopentadiene, allyl carbamate, alpha-methyl styrene, and the like can also be used to secure low molecular weights, as can unsaturated fatty acids or esters.

The polymerization to produce the amide polymer is best carried out by admixing the amide, any other monomer or monomers, and the catalyst and chain modifying agent, if any, in the solvent, and refluxing the resulting solution for a time sufficient to obtain the desired conversion. Ordinarily, the polymerization will be complete in about 1 to 16 hours. It is often desirable to add the catalyst in increments as the polymerization progresses, and good agitation and careful temperature control are also desirable because of the very rapid reaction rate and because the reaction is highly exothermic.

When necessary to produce the desired structures the carboxylic acid amide is reacted with an aldehyde, preferably in the presence of an alcohol. Formaldehyde, in solution in water (formalin) or in an alkanol such as butanol, or a formaldehyde-yielding substance such as paraformaldehyde, trioxymethylene, or hexamethylenetetramine, is greatly preferred. However, other aldehydes, including acetaldehyde, butyraldehyde, furfural, and the like, preferably containing only atoms of carbon, hydrogen and oxygen, can be used. It is ordinarily preferred to utilize about two equivalents of aldheyde for each amide group present in the interpolymer, although this ratio may be raised or lowered considerably if desired. For example, the ratio may be as high as 3.0 equivalents or as low as about 0.2 equivalent of aldheyde for each amide group in the interpolymer.

The reaction is preferably carried out by refluxing the aldehyde and the polymer in the presence of a mild acid catalyst, such as maleic anhydride. Other acid catalysts, such as oxalic acid, hydrochloric acid, or sulfuric acid, may also be employed, although there is some possibility of gelation occurring if the acid catalyst is too strongly acidic. The quantity of catalyst utilized may be varied widely; the more acidic the reaction medium, the greater the amount of etherification which will occur.

As noted above, similar polymeric materials may also be obtained by polymerizing a modified amide, such as an alkylolamide or an N-alkoxyalkyl amide. The polymerization utilizing an alkylolamide or an N-alkoxyalkylamide is carried out in substantially the same manner as when the unmodified amide is interpolymerized.

In addition to the amide polymer described above, the other essential component of the vehicles of this invention is an organopolysiloxane resin. Such organosiloxane resins are well known in the art, and those which are employed in this invention conform to the general unit formula:

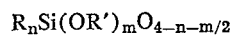

where R is a monovalent organic radical bonded to silicon by a carbon-to-silicon bond and R' is hydrogen, an alkyl radical, an aryl radical, or an acyl radical. The value of $n$ in the above formula is between about 0.5 and 1.9 and the value of $m$ between 0.01 and 2.5; the value of $m$ plus $n$ must be between 0.51 and 3.

The substituents represented by R in the above formula include, for example, monovalent hydrocarbon radicals such as methyl, ethyl, propyl, hexyl, octadecyl and similar alkyl radicals; monovalent cycloaliphatic radicals such as cyclohexyl, cyclobutyl, cyclopentyl; aryl radicals incuding alkaryl and aralkyl, for example, phenyl, methylpheny, benzyl, phenylethyl and the like; alkenyl, for instance, vinyl, allyl, 3-butenyl, oleyl and linoleyl; cycloalkenyl radicals such as cyclopentadienyl and 2-cyclobutenyl; as well as alkenyl-aryl groups such as the vinylphenyl radical. R may also be a substituted hydrocarbon radical, for example, a halo-substituted organic radical such as pentachlorophenyl, 1-bromo-3-trifluoropropyl, and perfluoroalkyl radicals, e.g., gamma-trifluoropropyl, delta-trifluoro-gamma-difluorobutyl, or it may be an amino-substituted hydrocarbon group such as aminomethyl, 3-aminopropyl, 4-aminobutyl and the like. Other substituted hydrocarbon radicals which may be included within the scope of the R substituent are cyano-substituted hydrocarbon radicals such as 3-cyanopropyl, carboxyl-substituted radicals such as 3-carboxylpropyl, and sulfur-substituted radicals, including 3-mercaptopropyl, ethyl thioethyl, ethyl dithiopropyl, ethyl sulfinylpropyl, ethyl sulfonylpropyl, as well as hydroxy-substituted radicals, such as hydroxypropyl or hydroxybutyl.

The groups represented by R' include hydrogen, in which case the OR' group is a hydroxyl radical, and alkyl groups of 1 to 20 carbon atoms, such as methyl, ethyl, propyl, butyl, amyl, hexyl, heptyl and octyl. R' may also be an aryl radical such as phenyl tolyl or halogen or other substituted phenyl, or an acyl radical such as acetyl, propionyl, butyryl or other similar acyl radicals, generally having between 1 and 8 carbon atoms.

The organosiloxane resins for use in this invention are produced by conventional methods; often an organoxysiloxane is partially hydrolyzed, thus replacing some of the alkoxy substituents with hydroxy groups, and the hydrolyzate is condensed to produce the desired siloxane resin. There may remain residual OH groups if the hydrolyzate is not completely condensed. The organosiloxane resin may also be produced using an organosilicon halide as the intermediate. Such methods are well known and the usefulness of organosiloxane resins of the above formula in the coating compositions of this invention does not depend upon the method by which they are produced.

Examples of organosiloxane resins and methods of producing them can be found in various publications as well as in patents such as U.S. Patents 2,258,218, 2,258,219, 2,258,222, 2,371,050, 2,389,477, 2,584,341, 2,663,694, 2,746,942, 2,768,149, and 3,015,637.

The preferred organosiloxane resins are those now commercially available, which usually contain phenyl and/or methyl substitution.

The compositions of the invention may also include an alkyd resin, either as a component to be mixed with the other resinous materials or as a coreaction product with the organosiloxane resin, i.e., an organosiloxane-modified alkyd resin. The alkyd resin may be any of the saturated or unsaturated, oil-modified or non-oil-modified alkyd resins utilized in the coatings field, and may be produced from any polybasic acid and polyfunctional alcohol. Thus, for example, the alkyd may be made from such polyfunctional acids as phthalic acid, maleic acid, fumaric acid, isophthalic acid, succinic acid, adipic acid, azelaic acid, sebacic acid, linoleic acid, ethyl hexoic acid, and the like, as well as from anhydrides of such acids. The polyfunctional alcohol can be, for example, glycerine, trimethylolethane, pentaerythritol, sorbitol, mannitol, ethylene glycol, diethylene glycol, 2,3-butylene glycol, and the like. Generally, oil-modified alkyd resins are employed.

Among the oils which can modify the alkyd for use herein are the drying, semi-drying and non-drying oils, including soya oil, safflower oil, perilla oil, tung oil, oiticia oil, poppyseed oil, sunflower oil, coconut oil, babassu oil, tall oil, walnut oil, fish oil and similar oils. It is desirable that the alkyd resin retain some functionality, such as unreacted hydroxyl groups.

The alkyd resin can be produced by any of the well known methods used to prepare alkyds for use in coatings. If the siloxane resin is to be incorporated into the alkyd component, the alkyd is made using ordinary techniques, except that the organosiloxane resin is added to the reaction mixture either after the reaction has proceeded for a time, or it can be added along with the other components of the alkyd prior to the heating of the mixture.

The proportions of the components of the composition are not ordinarily critical. It has been found that as little as 1 percent by weight of organopolysiloxane resin produces vehicles having desirable properties. For economic reasons it is usually undesirable to include more than about 40 percent by weight of the siloxane resin. Thus, in the ordinary practice of the invention, the vehicles contain between 1 and 40 percent organopolysiloxane resin. If an alkyd resin is included in the composition it is usually employed in an amount between about 5 percent and 40 percent by weight. The remainder of the vehicle comprises the amide polymer, which is thus present in an amount between about 20 percent and 99 percent by weight.

The vehicles of the invention can be produced by first preforming the amide polymer, the organopolysiloxane resin, and the alkyd resin, if one is employed. These components can be then blended at room temperature to produce the vehicle. The siloxane resin and the amide resin can be coreacted, if desired; similarly, the alkyd resin and the siloxane resin may be coreacted prior to their incorporation into the composition. Usually a solvent or mixture of solvents is employed to facilitate mixing of the resinous materials.

Surprisingly, the compositions of the several types described above can be made using any of the organopolysiloxane resins described. Thus, the so-called intermediate type of siloxane resins, which are relatively less condensed, and which are ordinarily utilized in producing siloxane-modified alkyd resins, can be so used in these coating compositions by incorporation into the amide polymer or the alkyd resin. However, they can also be employed in the cold blended compositions in which the components are simply blended at room temperature. Since these relatively less condensed types of siloxane resins are as a rule substantially less expensive than the more condensed resins, this provides a cost advantage in using these types or organopolysiloxanes in the several types of coating compositions above.

In addition to the essential components described there may be included in the coating composition other materials, particularly epoxy resins, such as polyglycidyl ethers of polyhydric compounds, epoxidized polyolefins, and epoxidized aromatic compounds. The composition may also include, for example, phenol-formaldehyde condensation products or other phenolic resins, amine-aldehyde resins, such as formaldehyde condensates of melamine or urea; nitrocellulose, and similar resinous materials. Additives which are conventionally used in the coating art, for example, plasticizers, anti-foaming agents, anti-skinning agents and similar products, can also be included in the vehicle or coating composition if so desired.

The compositions described can be used as such to make clear films, but usually are used as a vehicle in compositions in which there is incorporated a pigment composition. Any conventional pigment can be used; the pigment composition may include, for example, titanium dioxide, carbon black, talc, barytes, zinc sulfate, strontium chromate, barium chromate, ferric iron oxide, as well as color pigments such as cadmium yellow, cadmium red, phthalocyanine blue, chromic yellow, toluidine red, hydrated iron oxide, and the like. The enamels or coating compositions are produced by blending the vehicle and a pigment composition in accordance with well-known practice.

In ordinary usage of the coating compositions of this invention they are applied to the article to be coated, for example, by spraying or by similar conventional techniques, and then baked to form a hard, adherent film. Typical baking schedules include 300° F. for 30 minutes to 500° F. for 1 minute.

There are set forth below several examples which illustrate the nature and properties of the coating compositions of the invention. However, the invention should not be considered as being limited to their details. All parts and percentages are by weight.

*Example 1*

A reaction vessel was charged with the following:

| | Parts by weight |
|---|---|
| Acrylamide | 75.0 |
| Methacrylic acid | 37.5 |
| Styrene | 412.5 |
| Ethyl acrylate | 975.0 |
| Cumene hydroperoxide | 15.0 |
| t-Dodecyl mercaptan | 15.0 |
| High-boiling aromatic solvent (Solvesso 150) | 375.0 |
| n-Butanol | 375.0 |

The mixture was refluxed for 8 hours at 109 to 125° C., with additional 7.5 part portions of cumene hydroperoxide being added after the second, fourth and sixth hours. There were then added 500 parts of intermediate type phenyl-substituted siloxane resin (Dow-Corning Z-6018); this resin has an average molecular weight of about 1600 with an average of about four hydroxyl groups per molecule. Along with the siloxane resin there were added 157.5 parts of a 40 percent solution of formaldehyde in butanol, 2.0 parts of maleic anhydride, 7.5 parts of cumene hydroperoxide and 250 parts of high-boiling aromatic solvent. This mixture was refluxed while removing water azeotropically for 3 hours. After cooling, there were added 125 parts of butanol and 875 parts of high-boiling aromatic solvent. The resulting product had a solids content of 49.9 percent, an acid value of 7.89 and its Gardner-Holdt viscosity was P to Q.

Example 2

An aldehyde-modified, etherified amide polymer was prepared as in Example 1 except that no organopolysiloxane resin was added. The amide polymer had a solids content of 50 percent, in a solvent mixture of 29 percent butanol and 71 percent high-boiling aromatic solvent. A number of vehicles were produced by blending portions of this amide polymer at room temperature with the intermediate-type siloxane resin utilized in Example 1, with the proportion of siloxane resin varying up to 50 percent by weight, based on resin solids.

Example 3

(a) *Preparation of amide polymer A.*—A reaction vessel was charged with the following:

| | Parts by weight |
|---|---|
| Acrylamide | 10 |
| Styrene | 25 |
| Ethyl acrylate | 65 |
| n-Butanol | 50 |
| High-boiling aromatic solvent (Solvesso 150) | 50 |
| Cumene hydroperoxide | 1 |
| t-Dodecyl mercaptan | 1 |

The mixture was refluxed for 4 hours, ½ part cumene hydroperoxide being added after 2 hours, and again after 4 hours. Reflux was continued for 2 more hours, after which there were added ½ part cumene hydroperoxide, 0.27 part maleic anhydride and 21 parts of a 40 percent solution of formaldehyde in butanol (butyl Formcel). This mixture was then refluxed for 3 hours while removing water azeotropically. There were then added 5.5 parts of an epoxy resin comprising the reaction product of bisphenol A and epichlorohydrin having an epoxide equivalent of 600 to 700 (Epon 1001), and 5.5 parts of high-boiling aromatic solvent. After refluxing for ½ hour and cooling, the solution (50 percent solids) had a Gardner-Holdt viscosity of U to V.

(b) *Preparation of amide polymer B.*—Using the procedure employed in making amide polymer A, a polymer was produced from the following components:

| | Parts by weight |
|---|---|
| Acrylamide | 15.0 |
| Methacrylic acid | 2.5 |
| Styrene | 38.5 |
| Ethyl acrylate | 34.0 |
| Cumene hydroperoxide | 3.5 |
| Tertiary dodecyl mercaptan | 1.5 |
| n-Butanol | 50.0 |
| High-boiling aromatic solvent (Solvesso 150) | 61.1 |
| Butyl Formcel | 31.5 |
| Epoxy resin (Epon 1001) | 11.1 |
| Maleic anhydride | 0.4 |

The resulting 50 percent solids solution had a Gardner-Holdt viscosity of U to V and an acid value of 6 to 8.

(c) *Formulation of vehicle.*—A vehicle was produced using the above amide polymers by blending them at room temperature with an additive type organosiloxane resin comprising mono- and di-substituted methyl siloxane units and phenyl siloxane units (Dow-Corning DC–840), using the following formulation:

| | Percent |
|---|---|
| Amide polymer A | 73 |
| Amide polymer B | 9 |
| Siloxane resin | 15 |
| Epoxidized soybean oil plasticizer (Paraplex G–60) | 3 |

Example 4

Another vehicle was produced in the manner of Example 3 using a different organosiloxane resin and different proportions. The organosiloxane was a highly condensed additive type resin and contained both methyl and phenyl groups; it is known commercially as SR–82 (General Electric). The formulation was as follows:

| | Percent |
|---|---|
| Amide polymer A | 66 |
| Amide polymer B | 8 |
| Organosiloxane | 25 |
| Plasticizer (Paraplex G–60) | 1 |

Example 5

(a) *Preparation of siloxane alkyl modified resin.*—The following were chargd into a reaction vessel:

| | Parts by weight |
|---|---|
| 2-ethylhexoic acid | 117.0 |
| Trimethylolethane | 157.0 |
| p-Tertiary butyl benzoic acid | 11.7 |
| Isophthalic acid | 164.7 |
| Silicone anti-foaming agent | 7.0 |
| Xylene | 15.9 |

The mixture was heated slowly to 455° F. and held at 455 to 460° F. until the Gardner-Holdt viscosity was U to V in a 50 percent solids solution in high-boiling aromatic naphtha solvent (Hi-Sol 2306). To 231 parts of the alkyd resin thus produced (50 percent solids) there was added 346.6 parts of naphtha (Hi-Sol 2306) and the mixture was heated to 200° F. There was then added 346.6 parts of intermediate type, low molecular weight phenyl-substituted siloxane resin (Dow-Corning Z–6018) and the mixture then heated to 420° F. with agitation until the Gardner-Holdt viscosity was U to V at 78° F.

(b) *Formulation of vehicle.*—A vehicle was produced by blending the following at room temperature:

| | Percent |
|---|---|
| Amide polymer A | 75 |
| Siloxane modified alkyd produced above | 20 |
| Polyester type plasticizer (Multron R–12) | 5 |

Example 6

Another vehicle was produced in the manner of Example 5 above using the following formulation:

| | Percent |
|---|---|
| Amide polymer A | 60 |
| Siloxane modified alkyd resin from Example 5(a) | 33 |
| Plasticizer (Multron R–12) | 7 |

Example 7

(a) *Preparation of siloxane-modified alkyd resin.*—An alkyd resin was produced from 2-ethylhexoic acid, trimethylolethane, p-tertiarybutyl benzoic acid, and isophthalic acid. A mixture of 634 parts of 50 percent solids solution of the alkyd and 136 parts of naphtha (Hi-Sol 2306) was heated to 200° F., whereupon there were added 136 parts of low molecular weight phenyl-substituted siloxane resin (Dow-Corning Z–6018). This mixture was heated with agitation to 324° F. until the viscosity was U to V.

(b) *Formulation of vehicle.*—A vehicle was produced by blending the following:

| | Percent |
|---|---|
| Amide polymer A | 47.5 |
| Siloxane-modified alkyd produced above | 47.5 |
| Plasticizer (Multron R–12) | 5.0 |

Example 8

Another siloxane-modified alkyd resin used in formulating vehicles in the above manner was made as follows:

A mixture of 1020 parts of coconut oil, 150 parts of pentaerythritol, and 78 parts of trimethylolpropane was heated to 390° F. After the addition of 0.04 part litharge the mixture was heated to 440° F. until alcoholysis was complete. There were then added 1176 parts of phthalic anhydride, 76 parts of p-tertiarybutyl benzoic acid, 651 parts of trimethylolpropane and 90 parts of xylene. The reaction mixture was then refluxed at 440° F. until the Gardner-Holdt viscosity was Z3 to Z4 when reduced to 60 percent solids with high-boiling aromatic solvent. The acid number, based on solids, was 9.

The foregoing alkyd resin (2010 parts, 60 percent solids) was heated to 200° F. and 1206 parts of low molecular weight phenyl-substituted siloxane resin (Dow-Corning Z–6018) were added. This mixture was heated at 350° F. for 1½ hours while sparging lightly with inert gas. After the addition of sufficient high-boiling aromatic solvent to make the solids content 60 percent, the resin had a Gardner-Holdt viscosity of W to X and an acid number of 7, based on solids.

The vehicles produced in the above examples were utilized in making coating compositions employing various conventional pigments. For example, a typical pigment composition was made as follows: A pebble mill was charged with 248 parts rutile titanium dioxide, 14 parts of low oil absorption type anatase titanium dioxide, 22 parts of synthetic hydrated calcium silicate, 2 parts dimethyldioctadecyl ammonium bentonite, 112 parts amide polymer A, 25 parts isophorone, and 97 parts of high-boiling aromatic solvent (Hi-Sol 2306). This mixture was ground to 4½ Hegman fineness and there were then added 112 parts of amide polymer A, 2 parts of anti-settling compound, and 95 parts of talc. This mixture was then milled for an additional 4 hours; the pigment composition produced had a solids content of 59 percent.

Coating compositions utilizing the vehicles produced in the foregoing examples along the pigment compositions such as that exemplified above were coated on steel panels and baked using conventional techniques. They were found to have improved sheen retention and color retention over similar compositions not containing siloxane resins after exposure to weathering for periods of six months and longer. Significant improvement was also found in resistance to chalking, and, in addition, the siloxane-modified compositions tended to chalk in the original color, especially compared to unmodified compositions.

Similar results were obtained with various other siloxane resins of the class described, for example, low molecular weight phenyl-substituted siloxanes such as that known commercially as Dow-Corning XR–830, as well as with compositions employing other organosiloxanes and amide polymers of the several types disclosed.

According to the provisions of the patent statutes, there are disclosed above the invention and what are now considered to be its best embodiments. However, it is to be understood that, within the scope of the appended claims, the invention may be practiced otherwise than as specifically described.

We claim:
1. A vehicle for a coating composition comprising (1) a polymer of an unsaturated carboxylic acid amide, said polymer being characterized by containing amide groups having a hydrogen atom replaced by the structure:

$$-\overset{R}{\underset{|}{C}}HOR_1$$

where R is selected from the group consisting of hydrogen and alkyl radicals and $R_1$ is selected from the group consisting of hydrogen and organic radicals derived by removing the hydroxyl group from a monohydric alcohol and (2) an organopolysiloxane resin of the unit formula:

$$R_nSi(OR')_mO_{4-n-m/2}$$

where R is a monovalent organic radical bonded to silicon by a carbon-to-silicon bond, R' is selected from the class consisting of hydrogen, alkyl radicals of 1 to 20 carbon atoms, aryl radicals and acyl radicals of 1 to 8 carbon atoms, the value of $n$ is between 0.5 and 1.9, the value of $m$ is between 0.01 and 2.5, and the value of $n$ plus $m$ is between 0.51 and 3.

2. A vehicle for a coating composition comprising (1) an interpolymer of an unsaturated carboxylic acid amide and at least one other polymerizable ethylenically unsaturated monomer, said interpolymer being characterized by containing amide groups having a hydrogen atom replaced by the structure:

$$-\overset{R}{\underset{|}{C}}HOR_1$$

where R is selected from the group consisting of hydrogen and alkyl radicals and $R_1$ is selected from the group consisting of hydrogen and organic radicals derived by removing the hydroxyl group from a monohydric alcohol, and (2) an organopolysiloxane resin of the unit formula:

$$R_nSi(OR')_mO_{4-n-m/2}$$

where R is a monovalent organic radical bonded to silicon by a carbon-to-silicon bond, R' is selected from the class consisting of hydrogen, alkyl radicals of 1 to 20 carbon atoms, aryl radicals and acyl radicals of 1 to 8 carbon atoms, the value of $n$ is between 0.5 and 1.9, the value of $m$ is between 0.01 and 2.5, and the value of $n$ plus $m$ is between 0.51 and 3.

3. The vehicle of claim 2 in which said amide is acrylamide and said interpolymer contains amide groups having a hydrogen atom replaced by the structure:

$$-CH_2OR_1$$

where $R_1$ is lower alkyl.

4. The vehicle of claim 3 in which said interpolymer contains at least about 50 percent of the amide groups thereof having a hydrogen atom replaced by the structure:

$$-CH_2OR_1$$

where $R_1$ is lower alkyl.

5. The vehicle of claim 3 in which $R_1$ is butyl.

6. The vehicle of claim 2 in which said organopolysiloxane contains phenyl groups.

7. The vehicle of claim 2 which contains between about 1 and about 40 percent by weight of said organopolysiloxane resin.

8. A vehicle for a coating composition comprising (1) an interpolymer of an unsaturated carboxylic acid amide and at least one other polymerizable ethylenically unsaturated monomer, said interpolymer being characterized by containing amide groups having a hydrogen atom replaced by the structure:

$$-\overset{R}{\underset{|}{C}}HOR_1$$

where R is selected from the group consisting of hydrogen and alkyl radicals and $R_1$ is selected from the group consisting of hydrogen and organic radicals derived by removing the hydroxyl group from a monohydric alcohol, and (2) an organopolysiloxane resin of the unit formula:

$$R_nSi(OR')_mO_{4-n-m/2}$$

where R is a monovalent organic radical bonded to silicon by a carbon-to-silicon bond, R' is selected from the class consisting of hydrogen, alkyl radicals of 1 to 20 carbon atoms, aryl radicals and acyl radicals of 1 to 8 carbon atoms, the value of $n$ is between 0.5 and 1.9, the value of $m$ is between 0.01 and 2.5, and the value of $n$ plus $m$ is between 0.51 and 3, and (3) an alkyd resin.

9. The vehicle of claim 4 which contains between about 1 and about 40 percent by weight of said organopolysiloxane resin and between about 5 and about 40 percent by weight of said alkyd resin.

10. The vehicle of claim 4 in which the alkyd resin employed contains unreacted hydroxyl groups.

11. A vehicle for a coating composition comprising (1) an interpolymer of an unsaturated carboxylic acid amide and at least one other polymerizable ethylenically unsaturated monomer, said interpolymer being characterized by containing amide groups having a hydrogen atom replaced by the structure:

$$-\overset{R}{\underset{|}{C}}HOR_1$$

where R is selected from the group consisting of hydrogen and alkyl radicals and $R_1$ is selected from the group consisting of hydrogen and organic radicals derived by removing the hydroxyl group from a monohydric alcohol, and (2) an alkyd resin modified with an organopolysiloxane of the unit formula:

$$R_nSi(OR')_mO_{4-n-m/2}$$

where R is a monovalent organic radical bonded to silicon by a carbon-to-silicon bond, R' is selected from the class consisting of hydrogen, alkyl radicals of 1 to 20 carbon atoms, aryl radicals and acyl radicals of 1 to 8 carbon atoms, the value of $n$ is between 0.5 and 1.9, the value of $m$ is between 0.01 and 2.5, and the value of $n$ plus $m$ is between 0.51 and 3.

12. A method of producing a vehicle for a coating composition which comprises mixing and blending (1) a polymer of an unsaturated carboxylic acid amide, said polymer being characterized by containing amide groups having a hydrogen atom replaced by the structure:

$$-\overset{R}{\underset{|}{C}}HOR_1$$

where R is selected from the group consisting of hydrogen and alkyl radicals and $R_1$ is selected from the group consisting of hydrogen and organic radicals derived by removing the hydroxyl group from a monohydric alcohol, and (2) an organopolysiloxane resin of the unit formula:

$$R_nSi(OR')_mO_{4-n-m/2}$$

where R is a monovalent organic radical bonded to silicon by a carbon-to-silicon bond, R' is selected from the class consisting of hydrogen, alkyl radicals of 1 to 20 carbon atoms, aryl radicals and acyl radicals of 1 to 8 carbon atoms, the value of $n$ is between 0.5 and 1.9, the value of $m$ is between 0.01 and 2.5, and the value of $n$ plus $m$ is between 0.51 and 3.

13. A method of producing a vehicle for a coating composition which comprises mixing and blending (1) an interpolymer of an unsaturated carboxylic acid amide and at least one other polymerizable ethylenically unsaturated monomer, said interpolymer being characterized by containing amide groups having a hydrogen atom replaced by the structure:

$$-\overset{R}{\underset{|}{C}}HOR_1$$

where R is selected from the group consisting of hydrogen and alkyl radicals and $R_1$ is selected from the group consisting of hydrogen and organic radicals derived by removing the hydroxyl group from a monohydric alcohol, and (2) an organopolysiloxane resin of the unit formula:

$$R_nSi(OR')_mO_{4-n-m/2}$$

where R is a monovalent organic radical bonded to silicon by a carbon-to-silicon bond, R' is selected from the class consisting of hydrogen, alkyl radicals of 1 to 20 carbon atoms, aryl radicals and acyl radicals of 1 to 8 carbon atoms, the value of $n$ is between 0.5 and 1.9, the value of $m$ is between 0.01 and 2.5, and the value of $n$ plus $m$ is between 0.51 and 3.

14. A method of producing a vehicle for a coating composition which comprises coreacting (1) an interpolymer of an unsaturated carboxylic acid amide and at least one other polymerizable ethylenically unsaturated monomer, said interpolymer being characterized by containing amide groups having a hydrogen atom replaced by the structure:

$$-\overset{R}{\underset{|}{C}}HOR_1$$

where R is selected from the group consisting of hydrogen and alkyl radicals and $R_1$ is selected from the group consisting of hydrogen and organic radicals derived by removing the hydroxyl group from a monohydric alcohol, and (2) an organopolysiloxane resin of the unit formula:

$$R_nSi(OR')_mO_{4-n-m/2}$$

where R is a monovalent organic radical bonded to silicon by a carbon-to-silicon bond, R' is selected from the class consisting of hydrogen, alkyl radicals of 1 to 20 carbon atoms, aryl radicals and acyl radicals of 1 to 8 carbon atoms, the value of $n$ is between 0.5 and 1.9, the value of $m$ is between 0.01 and 2.5, and the value of $n$ plus $m$ is between 0.51 and 3.

15. A method of producing a vehicle for a coating composition which comprises mixing and blending (1) an interpolymer of an unsaturated carboxylic acid amide and at least one other polymerizable ethylenically unsaturated monomer, said interpolymer being characterized by containing amide groups having a hydrogen atom replaced by the structure:

$$-\overset{R}{\underset{|}{C}}HOR_1$$

where R is selected from the group consisting of hydrogen and alkyl radicals and $R_1$ is selected from the group consisting of hydrogen and organic radicals derived by removing the hydroxyl group from a monohydric alcohol, and (2) an organopolysiloxane resin of the unit formula:

$$R_nSi(OR')_mO_{4-n-m/2}$$

where R is a monovalent organic radical bonded to silicon by a carbon-to-silicon bond, R' is selected from the class consisting of hydrogen, alkyl radicals of 1 to 20 carbon atoms, aryl radicals and acyl radicals of 1 to 8 carbon atoms, the value of $n$ is between 0.5 and 1.9, the value of $m$ is between 0.01 and 2.5, and the value of $n$ plus $m$ is between 0.51 and 3, and (3) an alkyd resin.

16. A method producing a vehicle for a coating composition which comprises reacting an alkyd resin with an organopolysiloxane resin of the unit formula:

$$R_nSi(OR')_mO_{4-n-m/2}$$

where R is a monovalent organic radical bonded to silicon by a carbon-to-silicon bond, R' is selected from the class consisting of hydrogen, alkyl radicals of 1 to 20 carbon atoms, aryl radicals and acyl radicals of 1 to 8 carbon atoms, the value of $n$ is between 0.5 and 1.9, the value of $m$ is between 0.01 and 2.5, and the value of $n$ plus $m$ is betwen 0.51 and 3, to produce an organopolysiloxane-modified alkyd resin, and then mixing and blending the modified alkyd resin with an interpolymer of an unsaturated carboxylic acid amide and at least one other polymerizable ethylenically unsaturated monomer, said interpolymer being characterized by containing amide groups having a hydrogen atom replaced by the structure:

$$-\overset{R}{\underset{|}{C}}HOR_1$$

where R is selected from the group consisting of hydrogen and alkyl radicals and $R_1$ is selected from the group consisting of hydrogen and organic radicals derived by removing the hydroxyl group from a monohydric alcohol.

References Cited by the Examiner

UNITED STATES PATENTS

| | | | |
|---|---|---|---|
| 3,118,852 | 1/1964 | Christenson et al. | 260—826 |
| 3,118,853 | 1/1964 | Hart et al. | 260—826 |

References Cited by the Applicant

UNITED STATES PATENTS

| | | |
|---|---|---|
| 2,940,944 | 6/1960 | Christenson. |

OTHER REFERENCES

Vogel et al., "Coatings Based on Acrylamide Interpolymers," Official Digest, vol. 33, pages 699 to 708 (1961).

SAMUEL H. BLECH, *Primary Examiner.*

UNITED STATES PATENT OFFICE
CERTIFICATE OF CORRECTION

Patent No. 3,261,881　　　　　　　　　　　　　　July 19, 1966

Roger M. Christenson et al.

It is hereby certified that error appears in the above numbered patent requiring correction and that the said Letters Patent should read as corrected below.

Column 9, line 65, column 10, lines 13 and 53, column 11, lines 8, 30 and 54, column 12, lines 3, 26 and 39, the formula, each occurrence, should appear as shown below instead of as in the patent:

$$R_n Si(OR')_m \frac{O_{4-n-m}}{2}$$

Signed and sealed this 26th day of September 1967.

(SEAL)
Attest:

ERNEST W. SWIDER　　　　　　　　　　　　EDWARD J. BRENNER
Attesting Officer　　　　　　　　　　　　Commissioner of Patents